United States Patent [19]

Hahnewald et al.

[11] Patent Number: 5,237,913
[45] Date of Patent: Aug. 24, 1993

[54] BREAD TOASTER WITH A COOLING SYSTEM FOR THE CASING

[75] Inventors: Andrea Hahnewald, Sant Just Desvern, Spain; Stefan Schamberg, Usingen, Fed. Rep. of Germany

[73] Assignee: Braun Aktiengesellschaft, Frankfurt, Fed. Rep. of Germany

[21] Appl. No.: 932,363

[22] Filed: Aug. 19, 1992

[30] Foreign Application Priority Data

Aug. 24, 1991 [DE] Fed. Rep. of Germany ....... 4128174

[51] Int. Cl.⁵ .......................... A47J 37/08; H05B 3/06
[52] U.S. Cl. ........................................ 94/389; 99/385;
99/401; 99/447; 219/521; 219/531
[58] Field of Search ................. 99/340, 385, 389, 393,
99/401, 447; 219/521, 443, 377, 400, 531

[56] References Cited

U.S. PATENT DOCUMENTS

| | | | |
|---|---|---|---|
| 658,189 | 9/1900 | Morgan | 99/389 |
| 1,624,182 | 4/1927 | Rebora | 99/401 |
| 1,876,901 | 9/1932 | Forbes | 99/401 |
| 2,071,234 | 2/1937 | Merrill | 99/401 |
| 2,383,673 | 8/1945 | Olving | 219/521 |
| 2,862,441 | 12/1958 | Schmall | 99/340 |
| 2,941,463 | 6/1960 | DiCuia | 99/393 |
| 3,109,360 | 11/1963 | Baume | 99/401 |
| 4,396,825 | 8/1983 | Cox et al. | 219/531 |
| 4,718,332 | 1/1988 | Mothrath | 99/447 |
| 4,913,046 | 4/1990 | Mothrath et al. | 99/385 |

FOREIGN PATENT DOCUMENTS

| | | |
|---|---|---|
| 0033642 | 8/1981 | European Pat. Off. . |
| 0201818 | 5/1986 | European Pat. Off. . |
| 2950229A1 | 12/1979 | Fed. Rep. of Germany . |
| 3106719A1 | 2/1981 | Fed. Rep. of Germany . |
| 3035712 | 4/1982 | Fed. Rep. of Germany ........ 99/401 |
| 2642635 | 8/1990 | France . |

*Primary Examiner*—Timothy F. Simone
*Attorney, Agent, or Firm*—Fish & Richardson

[57] ABSTRACT

A bread toaster includes a cooling system for the casing which includes structure for dividing the air flow rising in an air guide duct into a laminar part and a second part which is supplied to the upper region of the toasting chamber.

13 Claims, 1 Drawing Sheet

Fig. 1
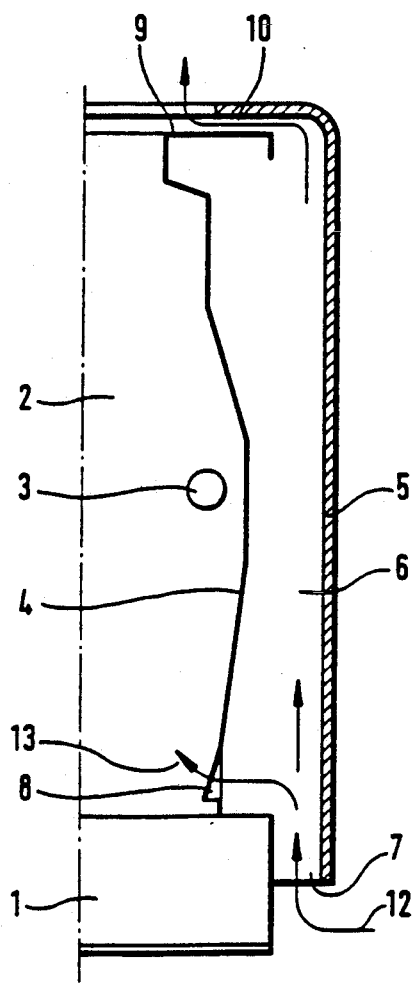
Fig. 2
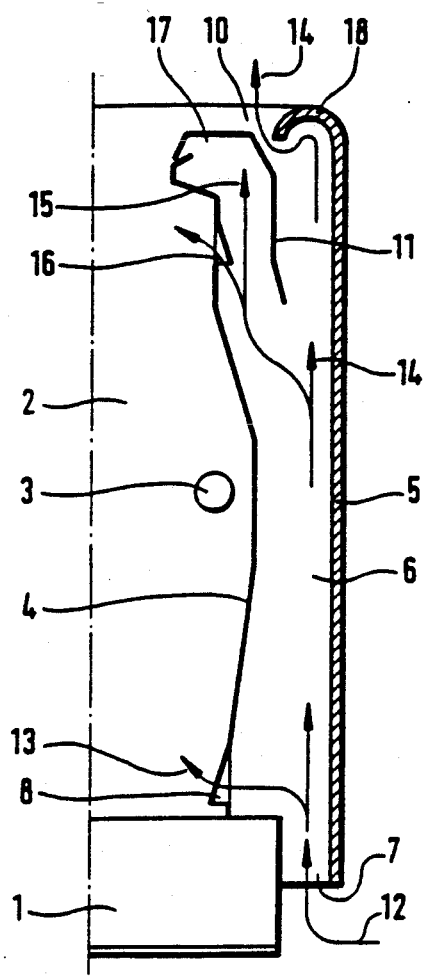
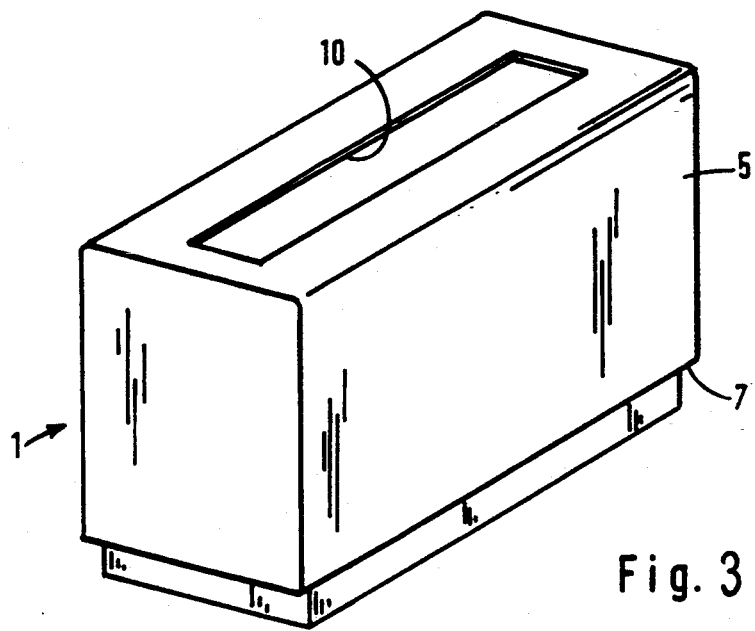
Fig. 3

BREAD TOASTER WITH A COOLING SYSTEM FOR THE CASING

The invention relates to a bread toaster with a cooling system for the casing.

BACKGROUND OF THE INVENTION

From the DE-OS 31 06 719 a bread toaster is known comprising a closed casing shell which encases the toasting chamber region with heating elements and reflectors. The casing shell additionally comprises an air guide duct extending from the inlet opening situated on the floor side up to an outlet opening situated in the cover plate at the upper side of the bread toaster. The closed casing shell forms the outermost shell of the casing and the air guide duct is arranged in such a way that the rising air cools the casing shell by convection.

Measurements have shown that particularly after several toasting cycles temperatures of up to 95° C. can occur at the upper side of the casing despite the air guide duct. These high temperatures are disadvantageous. In addition, they also occur in the casing shell in the area of the feed and discharge opening for the material to be toasted in the bread toaster. This leads to the danger of burning.

A further option for reducing the outer casing temperature is shown in U.S. Pat. No. 4,396,825. This known bread toaster comprises in its interior a thermal insulating material. The thermal insulating material protects the air guide duct from the toasting chamber zone. In order to achieve a sufficient thermal protection effect it is necessary to provide the insulating material with a sufficient thickness, which leads to a widening of the casing. In addition, the protection effect is substantially aimed more towards the side walls than towards the upper region of the bread toaster. In the upper region it is difficult to adjust the plate-like insulating material to the shape of the bread toaster and the air guide duct.

Furthermore, from the EP 201 818 an electric bread toaster is known with a meander-shaped cooling system for the casing. The meander-shaped cooling system reaches casing temperatures which lie in the area of skin temperature. The width of the known bread toaster also increases due to the meander-shaped course of the air guide duct.

It is therefore the object of the present invention to create a bread toaster of the class-forming type which achieves an improved cooling effect particularly in the upper and outer casing region at reduced widths of the casing.

SUMMARY OF THE INVENTION

In accordance with the invention means are provided in the upper region of the air guide duct. Said means carry out a division of the air flow. The rising air flow is divided into a laminar part which runs along the outer casing shell of the bread toaster and a part which is fed to the upper region of the toasting chamber. The laminar part is exhausted through the upper region of the cover plate of the bread toaster.

The division of the rising air flow by means of the division in accordance with the invention provides the casing shell, in a preferable manner, with increased cooling because the volume of the heated air flow reaching the upper region is reduced, i.e., the quantity of the heated air flow in the upper region is reduced and therefore can only transmit less heat energy onto the casing shell. The relatively strongly heated part of the air flow is fed, in accordance with the invention, to the toasting chamber and is exhausted at the feed and discharge opening for the materials to be toasted. The temperatures are much higher in the feed and discharge region for the materials to be toasted near the cover plate of the bread toaster, so that the divided part does not contribute substantially to the increase in temperature.

It has been seen that an increased cooling effect is achieved by this inventive measure despite the reduced air volume. In a preferable manner the unhindered laminar flow leads to an increased and unobstructed discharge of the heat by convection.

According to a further embodiment the means for dividing the air flow consist of separating tabs or deflecting flaps which are easy to manufacture.

If the means for dividing the air flow are aligned parallel to the casing shell in certain sectional intervals, it leads to an increased flow speed of the laminar part and therefore to increased cooling of the casing shell over its entire length und in its upper region.

A particularly higher cooling effect is achieved if the length of the means for dividing the air flow and, in particular, the separating tabs or deflecting flaps are approx. one-fifth the length of the air guide duct. If the division of the air flow were carried out too early, the rising air flow would not be sufficiently heated and the flow speed for the laminar part would be reduced due to the longer and narrower air guide duct.

This would lead to the fact that less heat could be carried off in the same time. All told, the suction effect in the inlet opening on the floor side for the cool air flow would be reduced and the passage time would rise. The heated part of the air volume would therefore have more time to heat the outer casing shell.

If the means for dividing the air flow and, in particular, the separating tabs or deflecting flaps are widened in a funnel-like manner in the branch region, a larger proportion of the heated air which is to be supplied to the toasting chamber can be intercepted.

If the means for dividing the air flow are attached to the reflector it is possible to provide an advantage in the manufacturing. This manufacturing advantage is additionally increased if the means for dividing the air flow and, in particular, the separating tabs or deflecting flaps are bent sheet metal components of the reflector.

In accordance with a further embodiment of the invention there is provided in the upper region of the casing shall a deflecting bow which is arranged in such a way that the laminar flow of the part of the air flow is supported and increased so as to deflect the laminar part in the direction towards the feed and discharge opening for the materials to be toasted. This leads to the fact that the strongly heated air flow rising vertically from the toasting chamber is enveloped by the considerably cooler exiting laminar flow. The upper casing region is thus protected from the hot air flow from the toasting chamber by the cooler laminar part.

BRIEF DESCRIPTION OF THE DRAWINGS

The invention is now outlined in greater detail by reference to the enclosed drawing in which:

FIG. 1 shows a cross-sectional view of a bread toaster in accordance with the state of the art;

FIG. 2 shows a cross section through a bread toaster in accordance with the invention.

FIG. 3 is a perspective view of a toaster (full view).

DESCRIPTION OF PARTICULAR EMBODIMENT

The bread toaster 1 in FIG. 1 in accordance with the state of the art is only showed in a simplified sectional view of a half of a side. The known bread toaster 1 comprises a casing shell 5, heating elements 3, a toasting chamber 2 and reflectors 4 of which only one is shown. The casing shell 5 is disposed at a distance from the rear side of reflector 4 and thus forms an air guide duct 6 which comprises an inlet opening 7 in the floor region of bread toaster 1.

The heating elements 3 have a temperature of 900° C. during the operation. These high temperatures heat the surrounding sheet metal components such as the reflectors 4 and the side walls to a temperature of 200° C. At the same time the air situated in the toasting chamber is heated and rises towards the feed and discharge opening for the material to be toasted provided in cover plate 9. The rise of the heated air produces a pressure below atmospheric in the toasting chamber 2, which produces the suction of fresh air 12 through the inlet opening 7 provided in the floor. From the introduced air flow a part 13 is supplied to the toasting chamber 2 through slots 8. The remaining part of the introduced air flow rises upwardly in the guide duct 6 and cools the casing shell 5.

On the upper side of the casing shell 5 there is disposed a deflection bow which deflects the increasingly heated air flow in the guide duct 6 by 90° parallel to the cover plate 9. The heated air flow is exhausted to the outside environment through an outlet opening 10 provided in the cover plate and meets the air flow which rises vertically from the toasting chamber 2.

FIG. 2 shows a bread toaster 1 in accordance with the invention. Due to the pressure below atmospheric in the toasting chamber 2, cooler fresh air 12 is sucked in through the inlet opening 7 provided in the floor region of the toaster. A smaller air flow 13 proportionally reaches the floor region of toasting chamber 2 through openings provided in reflector 4.

The main part of the freshly sucked air flow 12 rises upwardly in the guide duct 6. In accordance with the invention, the guide duct 6 is provided with means 11 dividing the air flow in the upper region. The one part 14 continues to flow to the deflection bow 18 as laminar flow and, finally, to the outlet opening 10 provided in the cover plate. The deflection bow 18 is arranged in such a way that the laminar flow of the part 14 is supported.

The second part 15 which is divided from the rising flow of air is supplied to the upper region of the toasting chamber 2 via openings 16 and other slots. The embodiment shown in FIG. 2 has means for dividing the air flow which consist of separating tabs or deflection flaps. As shown in FIG. 2, the separating tab or deflection flap is aligned parallel to the casing shell and comprises a bend in the forward region which forms a funnel. The part 15 separated from the rising air flow is unable to transmit any heat onto the casing shell 5 because it is supplied to toasting chamber 2. Rather, the separating tabs in accordance with the embodiment of FIG. 2, which separate the air flow, form a cul-de-sac-like second air guide duct 17 in combination with the rear side of the reflector 4, which duct allows the trapped air flow to escape through openings 16 only to the upper region of toasting chamber 2. In FIG. 2 the separating tab, which acts as a means 11 for separating the air flow, is arranged in the reflector 4 itself. The separating tab may, for example, be riveted on reflector 4. It is also possible that the separating tab is arranged as an extended sheet metal part of the reflector 4 by bending. In this event the separating tab and the reflector 4 are formed in one part. The funnel-like opening at the free end of the separating tab, which extends into the rising air flow, may divide a larger or smaller part 15 depending on the angular position. The bent end therefore serves for adjustment purposes for altered heating elements, for example.

Preferably, the separating tab dividing the air flow has a length of approximately one-fifth the length of the air guide duct 6. A separating tab with a length shortened by one-fifth leads to a particularly preferable cooling effect in the outer casing shell 5 due to the laminar part 14. The rising air in a separating tab with a shortened length has such a speed in the upper regions that the part 14 flows in a laminar manner along the casing shell 5 and brings about the desired cooling effect by convection.

With its free end the deflection bow 18 is directed towards the separating tab, thereby forming a narrow gap. The separating tab is bent to form an inclined plane in the region of the free end of the deflection bow. This arrangement provided before the discharge of the air through the outlet opening 10 results in an S-shaped laminar course of flow. As is shown in FIG. 2, other embodiments may provide that the separating tab may be disposed vertical to the casing shell 5. It is also possible to provide the adjustment of the separating tab to the course of the bend of deflection bow 18. In this event the separating tab would also have an S-like shape.

The means 11 for dividing the air flow in accordance with the invention may be provided at all sides of the bread toaster and are not limited to the application on the side wall of bread toaster 1 as shown in FIG. 2.

FIG. 3 is a perspective view of bread toaster 1.

We claim:

1. Bread toaster with a cooling system for the casing comprising toasting chamber structure that defines a toasting chamber, heating element structure and reflector structure disposed in said chamber structure, said chamber structure including cover plate structure, external casing shell structure encasing said toasting region, structure defining an inlet opening in the lower side of said shell structure, structure defining an outlet opening in said cover plate structure, structure disposed within said casing shell structure defining an air guide duct that extends from said inlet opening to said outlet opening whereby air rising in said air guide duct cools said external casing shell structure by convection, said air guide duct structure having an upper region, and divider structure in said upper region of said air guide duct for dividing the rising air flow into a laminar part which is exhausted through said outlet opening and into a second part which is supplied to said toasting chamber.

2. The bread toaster of claim 1 wherein said divider structure includes separating tab structure.

3. The bread toaster of claim 1 wherein said divider structure includes a portion extending parallel to said casing shell.

4. The bread toaster of claim 1 wherein said divider structure includes channel defining structure for said second part of the air flow, said channel defining structure having a length of about one-fifth of the length of said air guide duct.

5. The bread toaster of claim 1 wherein said divider structure includes funnel-like structure for channeling said second part of said air flow which is supplied to said toasting chamber.

6. The bread toaster of claim 1 wherein said divider structure is attached to said reflector structure.

7. The bread toaster of claim 6 wherein said divider structure is integral with said reflector structure.

8. The bread toaster of claim 1 wherein said casing shell comprises deflection bow structure adjacent said outlet opening, said deflector bow structure being disposed in the flow path of said laminar part of the air flow.

9. The bread toaster of claim 1 wherein said divider structure includes deflection flap structure.

10. The bread toaster of claim 9 wherein said divider structure is integral with said reflector structure.

11. The bread toaster of claim 10 wherein said divider structure includes channel defining structure for said second part of the air flow, said channel defining structure having a length of about one-fifth of the length of said air guide duct.

12. The bread toaster of claim 11 wherein said divider structure includes funnel-like structure for channeling said second part of said air flow which is supplied to said toasting chamber.

13. The bread toaster of claim 12 wherein said casing shell comprises deflection bow structure adjacent said outlet opening, said deflector bow structure being disposed in the flow path of said laminar part of the air flow.

* * * * *